June 29, 1926.                                               1,590,348
J. A. DAWSON
LIGHT
Filed July 16, 1923
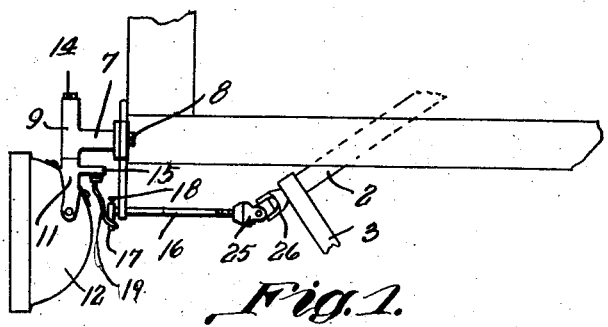
Fig. 1.
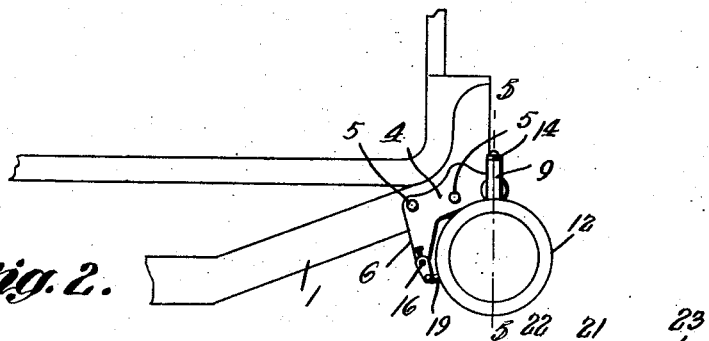
Fig. 2.
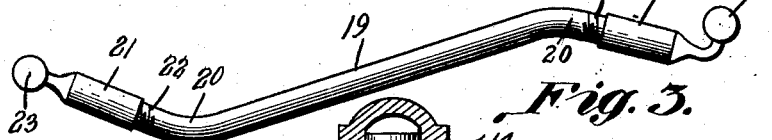
Fig. 3.
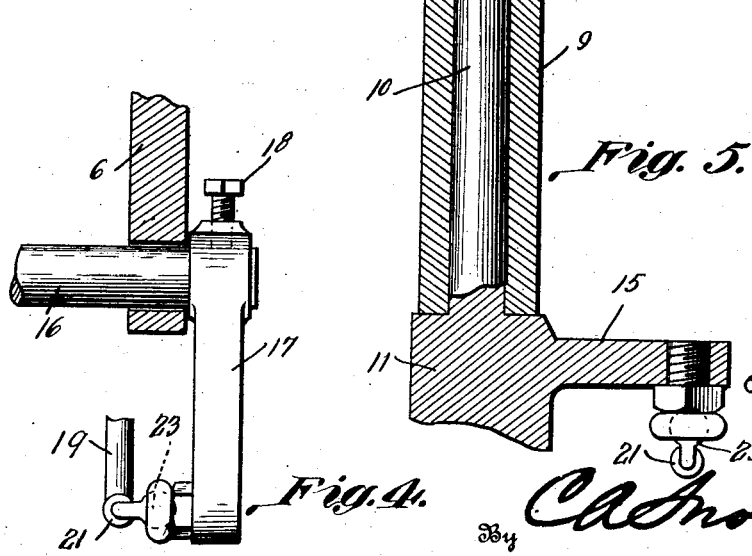
Fig. 5.
Fig. 4.
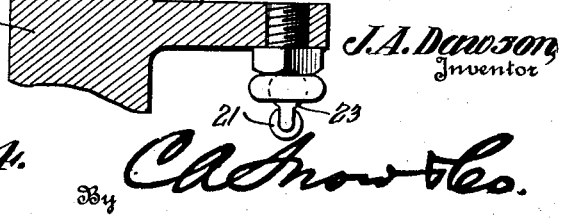
J. A. Dawson
Inventor
Attorneys Patented June 29, 1926.

1,590,343

UNITED STATES PATENT OFFICE.

JOSEPH ARTHUR DAWSON, OF PORTLAND, OREGON.

LIGHT.

Application filed July 16, 1923. Serial No. 651,904.

This invention aims to provide novel means whereby the lamp on an automobile may be turned automatically to follow the direction in which the vehicle is proceeding, novel means being provided for disposing the lamp at a low elevation, so that the lamp will operate below a fog bank, and the construction being such that the light will not cast a glare into the eyes of the drivers of approaching vehicles, and into the eyes of pedestrians.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in side elevation, a device constructed in accordance with the invention, mounted on a vehicle; Figure 2 is a front elevation; Figure 3 is an elevation showing one of the connecting rods; Figure 4 is a sectional detail showing one of the shafts and attendant parts; Figure 5 is a section on the line 5—5 of Figure 2.

In the drawing, there appears the side frame member, and the front frame member of a Ford car, the front frame member of the frame of the car being marked by the numeral 1, the steering shaft being shown at 2, the shaft carrying an arm 3 which is connected to the front wheels (not shown) in the usual way, to secure a steering of the vehicle. A support 4, in the form of a plate, is held by securing elements 5 on the front frame member 1 at one end thereof and includes a depending arm 6 located at the inner end of the support. The numeral 7 marks a horizontal bracket secured to the outer end of the support or plate 4 by a screw 8 or otherwise, the bracket being equipped at its forward end with a vertical bearing 9. A vertical shaft 10 is mounted to rock in the bearing 9 and is supplied at its lower end with a foot 11 attached to a lamp 12 located below the bearing 9. A nut 14 is threaded on the upper end of the shaft 10, the nut and the foot cooperating to hold the shaft 10 in the bearing 9 for rocking movement, as will be understood readily when Figure 5 of the drawing is noted. The foot 11 of the shaft 10 has a rearwardly extended arm 15. A horizontal shaft 16 is mounted to rock in the arm 6 of the support 4 and extends longitudinally of the vehicle. A depending crank arm 17 is secured by a set screw 18 to the forward end of the shaft 16 and is located in front of the arm 6 of the support 4, the crank arm being adapted to swing in a plane at right angles to the line of advance of the vehicle. A link 19 is provided and is offset at its ends, as shown at 20, so that motion may be transmitted conveniently from the crank arm 17 of the shaft 16 to the arm 15 of the lamp shaft 10. Couplings 21 are threaded for adjustment as at 22 on the ends of the link 19, ball and socket joints 23 uniting one of the couplings with the arm 17 of the shaft 16 and uniting the other of the couplings with the arm 15 on the lamp shaft 10. The numeral 25 denotes one member of a universal joint, the member 25 being mounted by threading or otherwise on the rear end of the shaft 16. The ordinary nut (not shown) which holds the arm 3 on the steering shaft 2, is removed, and the other member 26 of the universal joint is threaded on the forward end of the steering shaft 2 to hold the arm 3 on the steering shaft.

When rotation is imparted to the shaft 2, by the driver of the vehicle, to steer the vehicle, the universal joint 26—25 transmits motion to the shaft 16, and motion is transmitted to the link 19 by way of the arm 17 on the shaft 16. From the link 19, rocking movement is imparted to the shaft 10 and the lamp 12 by way of the arm 15 on the foot 11 of the lamp shaft 10. It will be obvious from the foregoing that when the operator steers the vehicle, the lamp 12 will follow the direction in which the vehicle is proceeding, the pathway in advance of the vehicle always be lighted up. Especial attention is directed to the fact that the lamp 12 is located below the bearing 9. The lamp 12, therefore, is at a low elevation, and will cast its rays forwardly, below the fog bank, it being a matter of common knowledge that the bottom of a fog bank, generally, is about two feet more or less from the surface of the ground, since the lamp 12 is located at so low an elevation, the rays proceeding from the lamp will not be projected into the eyes of drivers of approaching vehicles, and into the eyes of pedestrians.

What is claimed is:

The combination with the side frame member and the front frame member of a motor vehicle, of an L-shaped support including a transverse arm and a depending arm at the inner end of the transverse arm, the transverse arm being secured to the front frame member, the outer end of the transverse arm projecting laterally beyond the side frame member, and the lower end of the depending arm being extended below the front frame member, a bracket projecting forwardly from the transverse arm at the outer end thereof, a securing element connecting the bracket with the outer end of the transverse arm, and located outwardly of the side frame member, means for supporting a lamp for swinging movement in the bracket, a shaft journaled in the lower end of the depending arm and disposed below the front frame member, the shaft being located longitudinally of the side frame member, means for connecting the shaft operatively with the lamp, and means for operating the shaft.

In testimony that I claim the foregoing as my own, I have hereto affixed my signature.

JOSEPH ARTHUR DAWSON.